Figure 1:
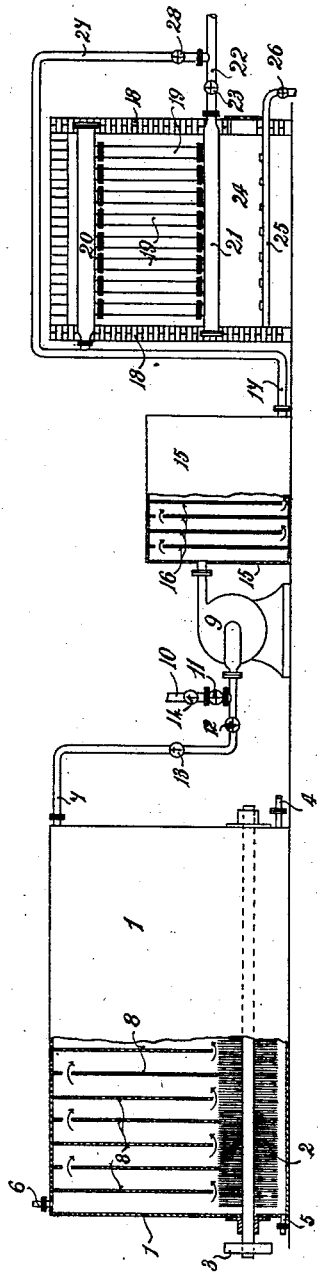

H. S. ELWORTHY, DEC'D.
E. G. ELWORTHY, ADMINISTRATRIX.
MANUFACTURE OF GAS FOR ILLUMINATING, HEATING, OR POWER PURPOSES.
APPLICATION FILED MAY 15, 1905.

943,627.

Patented Dec. 14, 1909.

3 SHEETS—SHEET 1.

WITNESSES:

INVENTOR:

H. S. ELWORTHY, DEC'D.
E. G. ELWORTHY, ADMINISTRATRIX.
MANUFACTURE OF GAS FOR ILLUMINATING, HEATING, OR POWER PURPOSES.
APPLICATION FILED MAY 15, 1905.

943,627.

Patented Dec. 14, 1909.

3 SHEETS—SHEET 3.

WITNESSES:
Fred White
René Bruine

INVENTOR:
Herbert Samuel Elworthy,
By his Attorneys
Arthur C. Fraser

UNITED STATES PATENT OFFICE.

HERBERT SAMUEL ELWORTHY, OF ST. ALBANS, ENGLAND; ELLEN GERTRUDE ELWORTHY ADMINISTRATRIX OF SAID HERBERT SAMUEL ELWORTHY, DECEASED.

MANUFACTURE OF GAS FOR ILLUMINATING, HEATING, OR POWER PURPOSES.

943,627. Specification of Letters Patent. Patented Dec. 14, 1909.

Application filed May 15, 1905. Serial No. 260,401.

*To all whom it may concern:*

Be it known that I, HERBERT SAMUEL ELWORTHY, of Battlefield Road, St. Albans, in the county of Herts, England, have invented certain new and useful Improvements in the Manufacture of Gas for Illuminating, Heating, or Power Purposes, of which the following is a specification.

The aim of this invention is to provide a new and valuable industrial process for the manufacture of gas for illuminating, heating, or power purposes.

The gas produced according to the invention is substantially coal gas, but with the important differences that it contains, as compared with ordinary coal gas, less hydrogen and more methane, and that there is a partial or total absence of carbon monoxid or dioxid, or of both oxids, depending on the way in which the invention is carried out and the temperature at which the reaction is conducted.

Broadly, the invention consists in submitting gas obtained from the destructive distillation of coal, bitumen, or other similar source (hereinafter in the description and claims referred to as "coal gas") to the action of metallic nickel at a suitable temperature or temperatures, whereby carbon monoxid or carbon dioxid, or both, present in the coal gas is caused to combine with the hydrogen thereof to form methane and water, the methane produced becoming blended with the residue of the coal gas in accordance with one or both of the following formulæ:

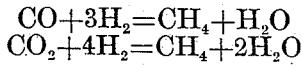

$$CO + 3H_2 = CH_4 + H_2O$$
$$CO_2 + 4H_2 = CH_4 + 2H_2O$$

according to the oxid or oxids of carbon acted upon.

There is generally more hydrogen present in coal gas than is required for the conversion of the oxid or oxids of carbon thereof into methane, and a further feature of the invention consists in blending coal gas with any form of water gas, Dowson gas, Siemens gas, or producer gas (or generally any form of combustible gas other than natural gas), and subjecting the mixture to the action of nickel at a suitable temperature or temperatures to convert the hydrogen and carbon monoxid or (and) dioxid into methane and water, the methane produced becoming likewise blended with the residue of the gas. Thus the surplus hydrogen of the coal gas is utilized to convert the oxid or oxids of carbon of the added gas, and a larger volume of converted gas is obtained. The term "water gas" includes any form of gas obtained by the passage of steam through incandescent fuel. If necessary the coal gas added may be in such quantity as to be theoretically sufficient for the conversion of the carbon monoxid and carbon dioxid into methane according to the above equations, but the proportion may be varied, depending upon the conditions of working and also the result which it is desired to attain and the use to which the gas is to be put.

In carrying out the invention, higher hydrocarbons other than methane should be separated substantially from the coal gas before passing it over the nickel alone or mixed with any of the other gases above mentioned. This may be effected by passing the coal gas through a scrubber containing a suitable solvent, such for instance as hydrocarbon oil. The gas obtained after subjection of the coal gas or mixture to the nickel may be afterward enriched with the hydrocarbons previously abstracted or with other suitable hydrocarbons to increase its illuminating properties, or such enrichment may be dispensed with. The hydrocarbons removed from the gas may be recovered from the solvent by distillation in the usual way, the solvent being used over again. The ammonia, sulfureted hydrogen, and other impurities should also be removed from the coal gas before it is subjected to the action of the nickel. This may be effected in the usual way, but when it is desired to convert the carbon dioxid of the gas into methane the lime purifying treatment may be omitted, thus effecting an important saving. Where water gas or other of the gases above mentioned are added to the coal gas before the reaction, these gases should also be freed from sulfur compounds and impurities.

It is well known that the ordinary manufacture of coal gas can only be conducted from gas coal of a certain quality, and care has to be taken to work at a proper temperature to secure the prescribed illuminating power. By the present invention a greater yield in quantity of coal gas can be obtained by conducting the manufacture at a higher temperature, and coal of an inferior quality can be utilized if necessary. Further, by substituting methane for the oxids of carbon usually contained in coal gas the illuminating power of the gas is largely increased and its noxious character reduced. The distillation of the coal or other material may be conducted with less regard to the illuminating power of the gas than has been hitherto possible. The gas obtained can therefore be larger in quantity than that ordinarily produced.

Assuming for the sake of illustration that the gas to be treated is coal gas of the ordinary type, this is first purified from the tar, ammonia, sulfureted hydrogen, and other impurities, the carbon dioxid being removed or not, according as it is desired to convert it into methane. The hydrocarbons other than methane being also removed as above mentioned, the gas is passed over metallic nickel at a suitable temperature or temperatures to cause the oxid or oxids of carbon to combine with the hydrogen present to form methane and water. The gas is thus deprived of the oxids of carbon and a large quantity of its hydrogen, and in place of these gases methane is substituted. The nickel apparently takes no part in the reaction, as at the end of the operation it remains unaltered. The temperature of the reaction is a matter of great importance, as the dioxid requires a higher temperature than the monoxid for its conversion, and the monoxid is liable to be converted into carbon and carbon dioxid if its temperature of conversion be much exceeded. Consequently when both oxids are present in the coal gas or mixture and it is desired to convert them into methane, it is preferable to conduct the process in two stages, the coal gas or mixture of coal gas and other gas as above mentioned being first subjected to the proper temperature for the conversion of the monoxid into methane and afterward to the higher temperature necessary for converting the carbon dioxid. Or the carbon monoxid or dioxid may be removed from the gas or mixture by any well-known method, and the remaining mixture passed over the nickel to convert the carbon monoxid or dioxid, as the case may be, into methane and water by combination with hydrogen.

As is known, the gas coming from the retorts during the distillation of coal contains at first very little hydrogen and large quantities of methane and the higher hydrocarbons, but as the distillation proceeds the proportions are reversed, and during the latter part of the operation the hydrogen increases very largely. According to the present invention the gas first produced and that given off at a later stage may be collected separately, and this latter part may be used as a source of hydrogen for the methane reaction. The first portion of the distillate may be employed direct for illuminating or other purposes. The later portion of the distillate may be purified and deprived of any higher hydrocarbons it may contain and then passed, with or without addition of water gas, producer gas, or other of the gases before mentioned, over the nickel to convert the carbon monoxid and (or) carbon dioxid and hydrogen present into methane and water.

In cases where the coal gas to be treated has not been subjected to the lime treatment for removal of the carbon dioxid, it may be desirable to add a small proportion of hydrogen to bring the proportion of hydrogen to approximately the theoretical proportion necessary for the conversion of the carbon oxid or oxids.

The nickel may be simply placed in layers in the powdered state upon suitably arranged shelves in a retort, chamber, or vessel; or it may be caused to adhere to the surface of some porous material as broken fire brick, pumice stone, or asbestos fiber, an agglutinating and not easily fusible substance being used, such as pipe clay, fire clay, magnesium chlorid, or other suitable material. Or the finely divided nickel itself may be made up into balls or blocks of any suitable size by being mixed with an agglutinating material and preferably also with some organic material, such as sawdust, which can be easily burned away, leaving the blocks more porous. Or the nickel may be used in the form of fine foil or wire, or it may be placed in tubes made of wire gauze. The finely divided nickel, as produced by the Mond reaction when the decomposition of the nickel carbonyl is conducted at a rather higher temperature than when it is desired to produce the nickel in a regulin state, is especially suitable for the purposes of this invention. It is also possible to employ copper or other metals as wire or sheets, or in other suitable form, coated by nickel either by the Mond process or by any other means. The nickel, however prepared, is placed in a retort, tower, or chamber, which may be heated internally or externally to the required temperature, say, for example, 250° C. for the carbon monoxid and 350° C. for the carbon dioxid. Instead of heating the chamber itself the gas only may be heated if necessary to the required temperature before admission, as in this manner the reaction is more under control, since hotter or colder gas can be admitted at any stage of the reaction so as to control the temperature. Or the reaction chamber may be constructed with a series of tubes or pipes, through which or outside which a current of cold air, or steam, or water can be passed to prevent the rise of temperatue which takes place, the nickel being placed either in the chamber itself or in the pipes, as may be found most suitable. Any other suitable means may be adopted for controlling the temperature, which is a matter of great importance for the reason above mentioned. When the reaction is conducted in two stages, as before mentioned, to convert both oxids of carbon into methane and water, the gases may be reheated during the intermediate stage, i. e. after the conversion of the monoxid at the lower temperature and before the conversion of the dioxid. The two stages are preferably conducted in separate chambers. The gas, after having been subjected to the action of nickel, may after further purification, if necessary, be conducted to a gas-holder, the steam formed in the reaction being preferably first condensed.

The apparatus which would be required for the purpose of carrying out the invention when coal gas alone is caused to react with the nickel comprises substantially a coal gas plant or coke oven plant, with a chamber or other receptacle for containing the nickel as described, also a scrubber in which a suitable solvent for the hydrocarbons (other than methane) in the coal gas is used to dissolve out such hydrocarbons. The apparatus required for carrying out the invention when a mixture of coal gas and water gas is caused to react with the nickel comprises substantially a coal gas plant or coke oven plant, a water gas plant, and a chamber or other receptacle for containing the metallic nickel, also a scrubber in which a suitable solvent for the hydrocarbons (other than methane) in the coal gas is used to dissolve out such hydrocarbons. In lieu of the water gas plant last mentioned, there may be substituted the ordinary plant for producing Dowson gas, producer gas, Siemens gas, or any modification of such gases.

Instead of mixing coal gas and water gas each obtained separately, a suitable mixture of the two gases may be obtained in an economical manner as follows:—Water gas is made by any of the well-known processes and is then superheated, either by passing it through hot blast furnaces of the ordinary type, or preferably by passing it through incandescent carbon contained in an ordinary producer; it is thence passed direct into another producer or chamber containing gas coal, whereby the latter is submitted to destructive distillation. The coal gas formed blends with the water gas, and the mixed gases, after suitable purification and removal of the heavy hydrocarbons, can then be submitted to the action of metallic nickel for the conversion of the oxids of carbon and hydrogen contained therein into methane and water as detailed hereinbefore. The heating-up stage of the superheater is preferably conducted with air at a high pressure, so as to insure the conversion of the coke into carbon dioxid, whereby a much higher temperature is produced.

In whatever way the invention may be carried into effect it will be understood that hydrogen or water gas, producer gas, Siemens gas, Dowson gas, or the like, or any or all of these gases, may be added to the coal gas before it is subjected to the nickel in order to secure the proportion of hydrogen and oxid or oxids of carbon theoretically necessary for the reaction to produce methane.

The manner in which the invention can be carried into effect will be understood from the following description and accompanying drawings of apparatus embodying the same, it being understood that this apparatus is given only by way of example and that the invention is in no way confined to the employment of the apparatus shown, which may be varied to suit different requirements.

Figure 2:
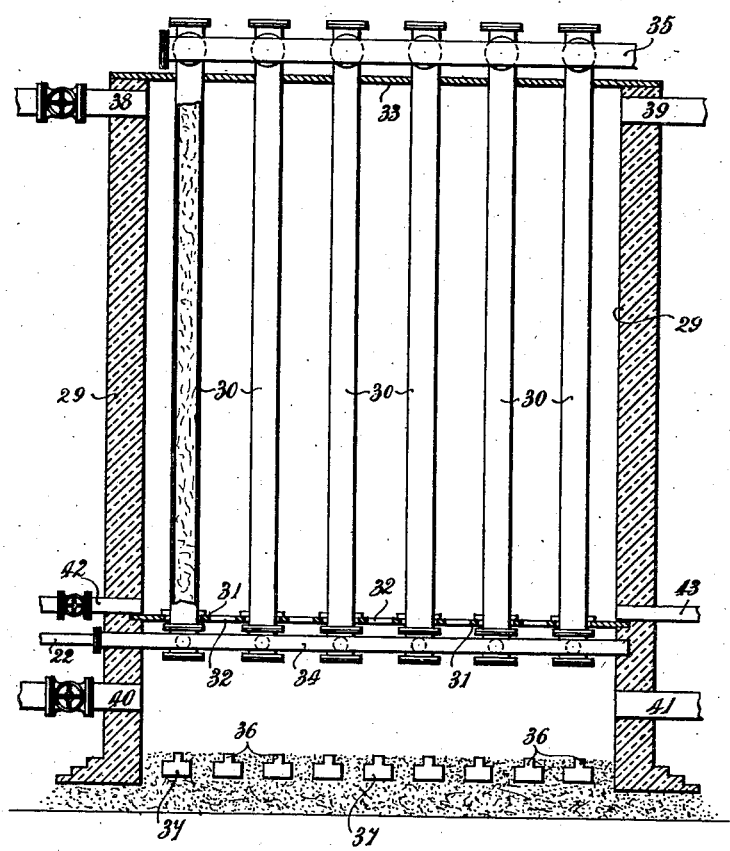
Figure 3:
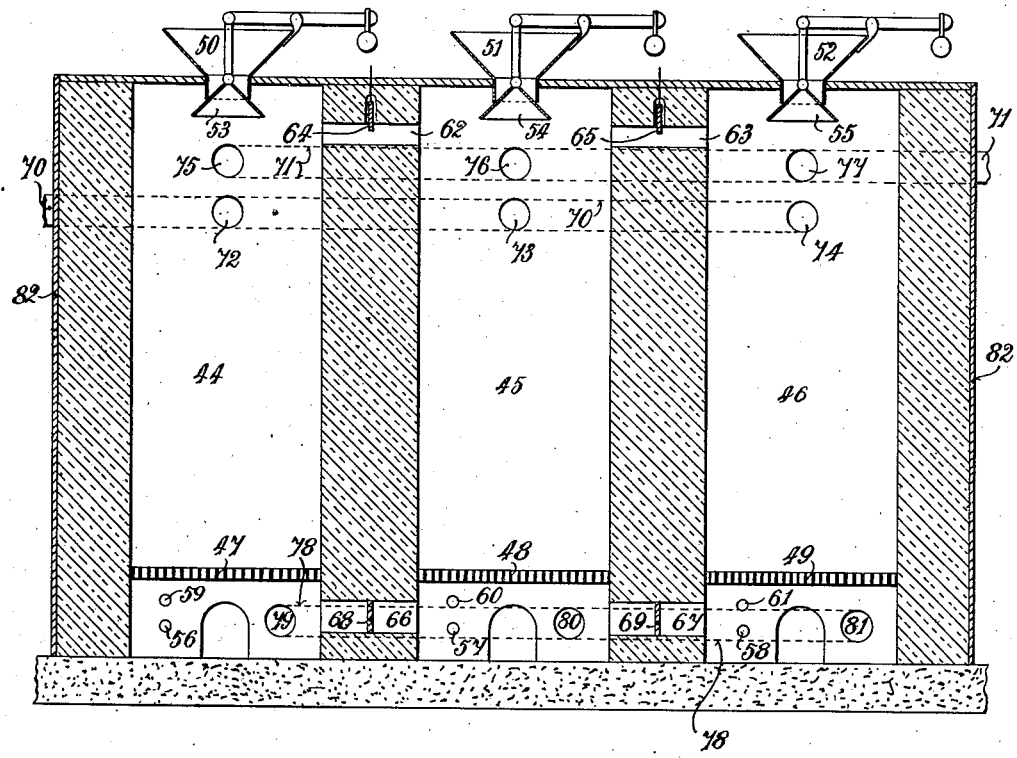

In the drawings Figure 1 is a side elevation partly in section of the apparatus up to and including the stove for heating the reaction mixture, and Fig. 2 is a sectional view of the nickel reaction chamber. Fig. 3 is a vertical section illustrating an arrangement of generator for producing a combined coal and water gas for use when a mixture of these gases is to be subjected to the action of nickel as before described.

1 is a scrubber consisting of a metal casing charged with any suitable solvent capable of substantially separating from the gas higher hydrocarbons other than methane. For instance, ordinary paraffin oil of a moderately high boiling point may be used.

2 is a rotary brush mounted in the base of the scrubber and driven by a belt pulley 3 so as to revolve in the solvent, which is admitted to the base of the scrubber by the pipe 4 and flows away through the pipe 5. The oil may be circulated through the scrubber by a pump (not shown) or other means, and may be treated in any suitable way to recover the absorbed hydrocarbons. The brush is driven at a relatively high speed, so that in revolving it sprays the hydrocarbon into the upper portion of the scrubber.

6 is the gas inlet pipe and 7 the gas outlet pipe, and 8 8 are vertical baffle plates disposed in the gas space of the scrubber; these cause the gas to take a sinuous course so as to be subjected thoroughly to the action of the oil.

It is of great importance to properly remove the higher hydrocarbons other than methane from the gas, and by employing a scrubber of the character just described this removal can be effected in a very efficient and satisfactory manner.

9 is a fan for drawing the gas forward through the system.

10 is a pipe fitted with a valve 11; this pipe may be connected to any convenient plant for producing any kind of water gas, producer gas, Siemens gas, Mond gas, Dowson gas, or the like, or to a supply of hydrogen.

12 is a valve fitted in the pipe 7.

When a mixture of the coal gas from the scrubber 1 and of water gas, producer gas, Dowson gas, or the like, or poorer coal gas is to be used, the relative proportion of the gases can be regulated by the valves 11 and 12, and meters 13 and 14 may be interposed at any suitable points in the pipes 7 and 10, so that the volumes passing can be observed and regulated. If hydrogen has to be added to bring up the percentage of same to that theoretically necessary for the reaction, it may be admitted by the pipe 10.

The fan 9 is connected to a mixing chamber 15 fitted with baffle plates 16, whereby when a mixture of gases is employed they are caused to take a sinuous course through the chamber so as to insure an intimate mixture.

17 is the outlet pipe from the mixing chamber and which delivers the gas to the heater or hot blast stove 18. This may consist as shown of a refractory brick chamber containing a series of vertical pipes, 19 opening into a horizontal pipe 20 at top and another horizontal pipe 21 at bottom, these latter pipes being closed at one end. The pipe 20 is connected to pipe 17 and pipe 21 to a pipe 22, which conducts the gas to the nickel reaction chamber and is fitted with a valve 23. A combustion chamber 24 is provided in the heater, and in the base of this chamber a gas pipe 25 may be laid below the pipe 21, or the gas may be brought into the furnace through suitable flues or channels in the concrete floor. The pipe 25 has a series of burners and is fitted with a valve 26 for opening or cutting off the gas supply. These burners may be fed with combustible gas from any suitable source, and conveniently with producer gas from the same source, which serves to supply the burners of the nickel chamber referred to later.

27 is a by-pass pipe fitted with a valve 28, whereby a part or the whole of the gas can be sent around the heater 18 instead of through the same, so as to regulate the temperature of the gas entering the nickel chamber through the pipe 22.

The nickel chamber in the form shown has been specially invented with the object of insuring intimate and thorough contact of the gas with the nickel so as to obtain an efficient reaction. It consists of a structure (with or without an outer metal case or shell) of brick 29, which may be faced internally with refractory material and in which are mounted a series of pipes 30 closed at both ends. Any desired number of rows of these pipes may be employed. They are supported on a bottom plate 31 formed with holes or perforations 32 over its surface for the passage of heating gases, and the chamber 29 is closed at top by a plate 33.

34 is a common inlet pipe connected to the pipe 22, and which admits the gas to the pipes 30 through openings or connections at the lower ends of these pipes; 35 is a common outlet pipe communicating with the pipes 30 at top and serving to lead away the gases therefrom. The pipes 30 are filled with nickel in any of the finely divided forms before mentioned, and it will be seen that as the gas to be treated is compelled to pass through these pipes it is brought into most intimate contact with the nickel therein. Instead of being vertical as shown the pipes 30 may be inclined or even horizontal.

36 are gas jets disposed in the base of the chamber, and serving for heating the chamber to start the reaction and for revivifying the nickel. These burners may be supplied with producer gas admitted to the channels 37 by any suitably arranged pipe.

38 and 39 are outlet pipes for the gases of combustion or for the cold air or steam used for controlling the temperature of the nickel chamber. 40 and 41 are air inlet pipes for combustion of the producer gas, while 42 and 43 are inlet pipes for cold air or steam for temperature control. These three pairs of pipes are controlled by valves to enable communication to be opened and closed between them and the interior of the chamber, and may be connected together so that one valve serves for each pair. Doors may be provided at any desired points to give access to the chamber for cleaning, inspection, and repair.

It will be understood that the apparatus shown is capable of modification in many ways. The scrubber may be replaced by any good ordinary commercial scrubber, or it may be omitted when it is not required to remove other hydrocarbons than methane before passing the gas to the nickel chamber. The hot blast stove may be replaced by any usual form of such apparatus while the nickel chamber may be arranged in many ways.

The operation of the apparatus described would be as follows:—The gas from the retorts, coke oven, or the like is first freed from ammonia, sulfureted hydrogen, and other impurities in any ordinary way, and if it is not desired to convert the carbon dioxid or alternatively the carbon monoxid present into methane as before mentioned, this may also be removed by any ordinary or convenient means. The gas is admitted by the pipe 6 to the scrubber, while the brush 2 is started and the circulating pump is set running to circulate the oil through the scrubber. The gas deprived of hydrocarbons other than methane is drawn away through the pipe 7 by the fan 9. If the coal gas is to be subjected to the action of the nickel without addition of water gas or other gas as above mentioned, the valve 11 will be closed, but when it is desired to add such other gas or gases the same is or are admitted by the pipe 10 and valve 11, and the valves 11 and 12 are adjusted to secure the proper mixture for the reaction in the nickel chamber or chambers. From the fan 9 the gas or mixture of gases is delivered through the mixing chamber 15 to the heater 18, whereby it is heated to a suitable degree for the reaction in the nickel chamber, or to any other desired extent, the valve 23 being opened to allow the gas to flow on to the nickel chamber 29. At the commencement of the reaction the gas jets 36 may be lighted to raise the chamber to the necessary temperature, the valve controlling the pipes 40, 41 being opened to supply the necessary air for the combustion, and the valve controlling the pipes 38, 39 being opened to allow the products of combustion to escape. Assuming the gas to contain substantially only carbon monoxid, the nickel chamber 29 should be kept at about 250° C., and as the reaction is strongly exothermic the temperature must be controlled. This may be effected by admitting steam or pumping cold air in through the pipes 42, 43 as required. With the same object the valves 23, 28 may be adjusted so that some or all of the gas is sent around the heater. The gas admitted by the pipe 34 passes up through the nickel in the pipes 30, and the carbon monoxid combines with the hydrogen to form methane and water. The resulting gas passes away by the pipe 35 and may be led through any suitable condenser (not shown) to arrest the steam present. If it is required to restore to the gas the hydrocarbons extracted in the scrubber 1, the oil from the scrubber may be distilled in any suitable still—for example, an ordinary tar still—or treated for recovery of the absorbed hydrocarbons, and the recovered hydrocarbons may be restored to the gas in any convenient way; for example, the gas may be passed through a chamber in which the distillate from the still is received, as will be well understood. Or any other suitable hydrocarbons can be used for enriching the gas. The gas, enriched or not, may be finally collected in a gasometer or the like. When the gas to be treated contains substantially only carbon dioxid, the procedure will be similar to that above described, but the temperature of the reaction chamber will be kept at about 350° C. If the gas to be dealt with contains both oxids of carbon, and it is required to convert them both into methane, the gas after passing through the nickel chamber 29 for the conversion of the carbon monoxid may be led on through a second heater and nickel chamber similar to those above described and provided with analogous means for regulating the temperature of the reaction, as will be understood without further illustration. In this case the temperature of the second nickel chamber will be regulated to about 350° C. to effect the conversion of the carbon dioxid, the resulting gas being led away through a condenser and enriched or not as before.

If it should be desired to adopt the modification wherein carbon monoxid is removed from a gas containing both oxids and to subject the gas with the remaining carbon dioxid to the action of the nickel, this may be performed by the known Mond reaction, the gas being passed over finely divided nickel at a suitable temperature about 50° C.; for example, whereby the monoxid combines with the nickel to form nickel carbonyl—$Ni(CO)_4$. The remaining gas may be then passed through the plant to the nickel chamber and subjected to the action of the nickel for the conversion of the dioxid. The nickel may be recovered from the nickel carbonyl by slightly raising its temperature, whereby the carbon monoxid is driven off. If, on the other hand, carbon dioxid is to be removed from the gas before the reaction, this may be performed in the known way by passing the gas through lime purifiers or through a solution of an alkaline carbonate. In whatever way the process is carried into effect, the hydrogen and oxid or oxids of carbon in the gas or mixture of gases should be in suitable theoretical proportion to yield methane and water on contact with the nickel. If less hydrogen is present than that theoretically required, the deficiency may be supplied by admitting hydrogen by the pipe 10 or other suitable connection, while if a mixture of coal gas and water gas, producer gas, Siemens gas, Dowson gas, or the like is to be treated, this added gas may be admitted by the said pipe or connection.

Should the nickel in the nickel chambers tend to become exhausted it may be revivified by heating the nickel by means of the gas jets 36 to say about 400° C. to 500° C. and passing a current of air over it for a short time. Or the air may be heated to a suitable temperature in a hot blast stove before passing it over the nickel. The air current is then stopped and hydrogen or water gas at about the same temperature is sent over it, whereby the oxid produced by the air current is reduced and metallic metal re-formed, which is then again ready for use.

Referring now to the combined coal and water gas producer illustrated in Fig. 3, this apparatus comprises three refractory brick furnace chambers 44, 45, and 46, each provided with a grate (47, 48, 49), charging hopper (50, 51, 52), charging valve (53, 54, 55), air blast nozzle (56, 57, 58), and steam injecting nozzle (59, 60, 61). The side chambers 44 and 46 communicate with the intermediate chamber 45 at top by flues 62, 63, adapted to be closed by dampers 64, 65, and at bottom by flues 66, 67, fitted with dampers 68, 69. 70 is a pipe connected to a chimney not shown, and 71 is another pipe for leading away the gas produced. These pipes communicate with the respective chambers of the generator by flues 72, 73, 74, and 75, 76, 77 fitted with suitable valves. Communication between the spaces below the grates of the chambers is also provided by means of a pipe 78 and flues 79, 80, 81 opening into the said spaces and likewise fitted with suitable valves. For small-sizer installations all three furnaces may be contained in one outer metal casing 82 as shown, but in large-sized plants it will probably be found more convenient for each element to be self-contained, the manner of working being nevertheless adhered to. In this case a metal casing should be provided for each element. In operation 44, 45, or 46 can be used either as a water gas producer, superheater, or coal gas producer, each in turn being charged as required, but it will be sufficient to describe the case in which 44 is used as the water gas producer, 45 as the superheater, and 46 as the coal gas producer. 44 and 45 are charged with coke and 46 with raw coal, preferably as used for commercial gas production. The fuel in all three chambers is ignited, and a strong blast of air is blown in through the nozzles 56, 57, 58, the blowing being continued only for a short time in 46, but for a longer time in 44 and 45, or until the fuel in these two chambers is raised to high incandescence. The valves controlling flues 72, 73, 74 being open, the products of combustion pass away through these flues and the pipe 70 to the chimney. When the temperature in 44 and 45 is sufficiently high, the air is shut off from these chambers, and steam, preferably superheated, is blown into 44 through the nozzle 59, the valves 64 and 69 and that containing the flue 77 being opened, and the other valves closed. The steam passes up through the fuel in 44, where it is decomposed, with the formation of water gas, and thence passes through the passage 62 and down through the highly incandescent fuel in 45, where it is strongly superheated; at the same time any steam which has escaped decomposition in 44 is decomposed in 45. The highly superheated water gas passes on through the passage 67 into the coal gas producer 46, and as it rises through the raw fuel contained therein the volatile portion of the fuel is distilled and the coal gas thus formed becomes mixed with the water gas and is carried away through the flue 77 and pipe 71 to the purifiers. It will thus be seen that one chamber is worked in the ordinary manner of a water gas producer, one as a superheater and the other as a coal gas retort. By appropriate manipulation of the valves the furnaces may be changed in rotation, so that each in turn performs one of the functions of the plant, the chambers being charged in turn with gas coal, which, after distillation, can be heated up to a higher temperature by the air blast and used as the superheater. The superheater can be worked either with heated fuel as described or an ordinary checker brick filling may be used therein. In this latter case it will serve permanently as the superheater. The pipe 78 and flues 79, 80, and 81 are provided for use when the order of working the furnace is changed, and when the furnace which is being used as a superheater is separated from that used as the water gas producer by the coal gas producer. The various valves may be so connected in a group or groups by any suitable mechanical arrangement as to allow of their manipulation by one or more movements of a lever or levers in order to lessen the labor required. The combined water and coal gas should be purified, which may be effected in the well-known manner, the carbon dioxid being removed or not as required, and the gas can then be passed through the methane producing plant with or without previous addition of water gas or other of the gases before mentioned.

I do not either claim the process of manufacturing gas which consists in passing a combustible gas containing oxid of carbon and hydrogen in contact with nickel in the presence of a large quantity of a combustible gas inert to nickel and carbonaceous products, with variations of such process, nor the article which is produced thereby. These are described and claimed in an application filed by me May 26, 1905, Serial No. 262,477.

What I claim and desire to secure by Letters Patent is:—

1. A process for the manufacture of gas rich in methane for illuminating, heating or power purposes, said process consisting in the production of a gas produced by destructive distillation of carbonaceous material, separating therefrom hydrocarbons other than methane and afterward passing the gas over metallic nickel at a suitable temperature to produce methane and water, the methane produced becoming mixed with the residue of the gas.

2. A process for the manufacture of gas for illuminating, heating or power purposes, said process consisting in the production of a gas produced by destructive distillation of carbonaceous material, separating therefrom hydrocarbons other than methane and afterward passing the gas over metallic nickel in the presence of hydrogen in substantially theoretical proportion for the conversion of oxid of carbon present into methane and water, and at a suitable temperature for such conversion.

3. A process for the manufacture of gas for illuminating, heating or power purposes, said process consisting in the production of a gas produced by destructive distillation of carbonaceous material, separating therefrom hydrocarbons other than methane, mixing therewith a combustible gas rich in oxid of carbon and passing the mixture of gases over metallic nickel at a suitable temperature for the production of methane and water the methane produced becoming mixed with the residue of the gas.

4. A process for the manufacture of gas for illuminating, heating or power purposes, said process consisting in the production of a gas by destructively distilling carbonaceous material, separating therefrom hydrocarbons other than methane, blending therewith any form of water gas and passing the mixture of gases over metallic nickel at a suitable temperature to convert oxid of carbon and hydrogen present therein into methane and water.

5. A process for the manufacture of gas for illuminating, heating or power purposes, said process consisting in the production by destructively distilling carbonaceous material, of a gas containing carbon monoxid and carbon dioxid, separating therefrom hydrocarbons other than methane and afterward passing the gas first over metallic nickel at a suitable temperature to convert the monoxid and a portion of the hydrogen present into methane and water and passing the resulting gas over a further quantity of nickel at a suitable temperature for the conversion of the dioxid and a further quantity of hydrogen, substantially as described.

6. A process for the manufacture of gas for illuminating, heating or power purposes, said process consisting in the production by destructively distilling carbonaceous material of a gas containing carbon monoxid and carbon dioxid, separating therefrom hydrocarbons other than methane, and afterward passing the gas, in presence of hydrogen in substantially theoretical proportion for the conversion into methane and water of the monoxid and dioxid present, first over metallic nickel at a suitable temperature for the conversion of the monoxid and a portion of the hydrogen, and then over a further quantity of nickel at a suitable temperature for the conversion of the dioxid and a further quantity of hydrogen, substantially as described.

7. A process for the manufacture of gas for illuminating, heating or power purposes, said process consisting in the production of a gas by destructively distilling carbonaceous material separating therefrom hydrocarbons other than methane mixing therewith a combustible gas rich in oxid of carbon, the resulting mixture containing both carbon monoxid and carbon dioxid, and passing said mixture first over metallic nickel at a suitable temperature for the conversion into methane and water of one of said oxids and a portion of the hydrogen present and then over a further quantity of nickel at a suitable temperature for the conversion of the other oxid and a further quantity of the hydrogen, substantially as described.

8. A process for the manufacture of gas for illuminating, heating or power purposes, said process consisting in the production of a gas by destructively distilling carbonaceous material, separating therefrom hydrocarbons other than methane, mixing therewith any form of water gas, the resulting mixture containing carbon monoxid and carbon dioxid and passing said mixture in presence of hydrogen in substantially theoretical proportion for the conversion of both oxids into methane and water, first over metallic nickel at a suitable temperature to effect the conversion of the monoxid and then over a further quantity of nickel at a suitable temperature for the conversion of the dioxid, substantially as described.

9. A process for the manufacture of gas for illuminating, heating or power purposes, said process consisting in the production by destructively distilling carbonaceous material, of a gas containing carbon monoxid and carbon dioxid, separating therefrom one of said oxids and hydrocarbons other than methane and afterward passing the gas over metallic nickel at a suitable temperature to convert the other oxid and hydrogen present into methane and water, substantially as described.

10. A process for the manufacture of gas for illuminating, heating or power purposes, said process consisting in the production of a gas by destructively distilling carbonaceous material, mixing with said gas a combustible gas rich in oxid of carbon, as water gas, the resulting mixture containing carbon monoxid and carbon dioxid, separating therefrom one of said oxids and hydrocarbons other than methane, and afterward passing the gas in presence of hydrogen in substantially theoretical proportion for the conversion into methane and water of the other oxid, over metallic nickel at a suitable temperature for such conversion, substantially as described.

11. A process for the manufacture of gas for illuminating, heating or power purposes, said process consisting in the production of a gas by destructively distilling carbonaceous material, said gas containing carbon monoxid and carbon dioxid, separating therefrom carbon dioxid and hydrocarbons other than methane and afterward passing the gas over metallic nickel at a suitable temperature to convert the other oxid and hydrogen present into methane and water, substantially as described.

12. In the manufacture of gas for illuminating, heating, or power purposes by the passage in contact with hot nickel of a gas obtained by destructively distilling carbonaceous material, the process which consists in colecting the gas evolved at earlier and later stages of the distillation separately and subjecting the later portion to the action of the nickel for the production of methane, the methane formed mixing with the residue of the gas, substantially as described.

13. In the manufacture of gas for illuminating, heating, or power purposes by the passage in contact with hot nickel of a gas obtained by destructively distilling carbonaceous material, the process which consists in collecting the gas evolved at earlier and later stages of the distillation separately, mixing the later portion of the distillate with a combustible gas rich in oxid of carbon, and subjecting the resulting gas to the action of the nickel for the production of methane, the methane formed mixing with the residue of the gas, substantially as described.

14. A process for the manufacture of gas for illuminating, heating or power purposes, said process comprising the production of a combined coal and water gas, separating therefrom hydrocarbons other than methane and afterward passing the gas over metallic nickel at a suitable temperature to convert hydrogen and oxid of carbon into methane and water substantially as described.

15. A process for the manufacture of gas for illuminating, heating or power purposes, said process comprising the production of a combined coal and water gas, separating therefrom hydrocarbons other than methane and afterward passing the gas in presence of hydrogen in substantially theoretical proportion for the conversion of oxid of carbon contained therein, over metallic nickel at a suitable temperature to effect such conversion, substantially as described.

16. A process for the manufacture of gas for illuminating, heating or power purposes, said process comprising the production of a combined coal and water gas, containing carbon monoxid and carbon dioxid, separating therefrom hydrocarbons other than methane and afterward passing the gas in presence of hydrogen in substantially theoretical proportion for the conversion of said oxids into methane and water, first over metallic nickel at a suitable temperature for the conversion of the monoxid and then over a further quantity of nickel at a suitable temperature for the conversion of the dioxid, substantially as described.

17. A process for the manufacture of gas for illuminating, heating or power purposes, said process comprising the production of a combined coal and water gas containing carbon monoxid and carbon dioxid, separating therefrom one of said oxids and hydrocarbons other than methane and afterward passing the gas over metallic nickel at a suitable temperature to convert the other oxid and hydrogen present into methane and water, substantially as described.

18. In the manufacture of gas for illuminating, heating or power purposes by the passage in contact with hot nickel of a gas obtained by destructively distilling carbonaceous material, the process which consists in producing water gas, superheating the same and passing such superheated water gas through a chamber charged with gas coal, whereby the coal is subjected to destructive distillation and the coal gas formed mixed with the water gas to form a combined coal and water gas substantially as described.

19. In the manufacture of gas for illuminating, heating or power purposes by the passage in contact with hot nickel of a gas obtained by destructively distilling carbonaceous material, the sub-process which consists in passing the gas before it is subjected to the nickel, through a solvent of its hydrocarbons other than methane, as hydrocarbon oil, whereby said hydrocarbons are removed, substantially as described.

20. In the manufacture of gas for illuminating, heating, or power purposes by the passage in contact with hot nickel of a gas obtained by destructively distilling carbonaceous material, the sub-process which consists in passing the gas, before it is subjected to the nickel, through a solvent of its hydrocarbons other than methane, as hydrocarbon oil, whereby said hydrocarbons are removed, and enriching the gas after subjection to the nickel, by restoration of the extracted hydrocarbons, substantially as described.

21. A process for the manufacture of gas rich in methane for illuminating, heating or power purposes, which consists in producing a gas by destructive distillation of carbonaceous material, and causing a reaction of an oxid of carbon and hydrogen therein to form methane.

In witness whereof, I have hereunto signed my name in the presence of two subscribing witnesses.

HERBERT SAMUEL ELWORTHY.

Witnesses:
GEORGE BELOE ELLIS,
THOMAS L. WHITEHEAD.